United States Patent [19]

Bjerklund et al.

[11] Patent Number: 5,112,357
[45] Date of Patent: May 12, 1992

[54] DEOXYGENATION SYSTEM AND METHOD

[75] Inventors: Gunnar Bjerklund, Rolling Meadows; Gino Notardonato, Park Ridge; Casimir Pulawski, Chicago, all of Ill.

[73] Assignee: Universal Beverage Equipment, Inc., Willowbrook, Ill.

[21] Appl. No.: 593,054

[22] Filed: Oct. 5, 1990

[51] Int. Cl.⁵ .................................................. B01D 19/00
[52] U.S. Cl. ............................................ 55/53; 55/189; 55/196; 55/55
[58] Field of Search ................ 55/53, 55, 196, 189, 55/190

[56] References Cited

U.S. PATENT DOCUMENTS

| | | | |
|---|---|---|---|
| 3,132,013 | 5/1964 | Kumamoto et al. | 55/53 |
| 3,885,930 | 5/1975 | Scheerer | 55/196 |
| 3,945,411 | 3/1976 | Skoli et al. | 141/91 |
| 4,191,784 | 3/1980 | Mojonnier et al. | 426/475 |
| 4,259,360 | 3/1981 | Venetucci et al. | 426/231 |
| 4,260,398 | 4/1981 | Ransohoff | 55/41 |
| 4,265,167 | 5/1981 | Mojonnier et al. | 99/323.2 |
| 4,300,923 | 11/1981 | Skoli et al. | 55/196 |
| 4,316,725 | 2/1982 | Hovind et al. | 55/55 |
| 4,358,296 | 11/1982 | Notardonato et al. | 55/38 |
| 4,612,021 | 9/1986 | Blund et al. | 55/53 |
| 4,613,347 | 9/1986 | Ranchet et al. | 55/53 |

FOREIGN PATENT DOCUMENTS 38760 10/1976 Japan ........................ 55/196

Primary Examiner—Bernard Nozick
Attorney, Agent, or Firm—Wood, Phillips, VanSanten, Hoffman & Ertel

[57] ABSTRACT

A deoxygenation system has a tank defining a deoxygenation chamber and a liquid input pipe that terminates in a dispenser head within the chamber. A gas input pipe injects gas into the liquid input pipe prior to the dispenser head. Optionally, the deoxygenation system also includes a chamber gas input pipe having a gas outlet within the chamber for introducing gas directly into the chamber and a sifter plate for enhancing contact between the liquid and the gas injected into the chamber. The sifter plate is located between the dispenser head and the chamber gas input. To further enhance deoxygenation, a portion of the deoxygenated liquid can be recirculated back into the chamber.

18 Claims, 1 Drawing Sheet

DEOXYGENATION SYSTEM AND METHOD

TECHNICAL FIELD

The present invention relates to a system for removing oxygen from a liquid having an undesirably high oxygen content and in particular is directed to a system and process wherein a stripping gas is injected into the liquid flow prior to discharging of the liquid and gas into a deoxygenation chamber. The liquid can be water which is to be utilized in the preparation of beer or soft drink beverages.

BACKGROUND OF THE INVENTION

There are many uses for liquids having reduced levels of oxygen. For example, modern methods of preparing beer and other beverages require the use of deaerated or deoxygenated water. Deoxygenation improves beverage stability during preparation, filling of the container and storage. If the beverage is contained in a can inclusion of oxygen can result in deterioration of the can lining thereby damaging the can and spoiling the flavor of the beverage.

U.S. Pat. No. 4,216,711 to Skoli et al. and U.S. Pat. No. 42,651,672 to Mojonnier et al. disclose deaeration apparatus wherein the water flows down a torturous, serpentine path as the stripping gas flows up the same path to achieve close intimate intermixing. U.S. Pat. No. 4,352,682 to Kemp Jr. et al. discloses a deoxygenating apparatus having a mixing chamber containing insoluble reticulated material to encourage turbulent water and gas flow and intimate water and gas intermixing action.

Unfortunately, these aforementioned apparatus are relatively complicated and require additional elements to obtain the intermixing necessary to achieve deaeration. Furthermore, the apparatus of the Skoli et al. and Mojonnier et al. Patents are relatively bulky and large.

A deoxygenation system that provides a liquid having a reduced level of oxygen therein yet is relatively uncomplicated and compact and that utilizes a reduced number of elements would be desirable. A process achieving the same results would also be desirable. The present system and process satisfy these desires.

SUMMARY OF THE INVENTION

The present invention is directed to a deoxygenation system having a deoxygenation tank defining a deoxygenation chamber therein, a liquid input pipe terminating in a dispenser head within the chamber and a gas inlet pipe for injecting gas into the liquid inlet pipe before the dispenser head.

The dispenser head preferably creates numerous streams of water to increase the surface area of the water dispensed into the chamber. Increasing the surface area enhances the stripping action.

The gas strips away at least a portion of the oxygen in the liquid as by replacement or binding thereto while the liquid and gas are in contact. Other gases that were originally in the liquid can also be stripped. The excess stripping gas, oxygen and the other gases are vented from the tank through a gas discharge pipe.

The chamber is at a reduced pressure as compared to the pressure in the liquid input pipe. The chamber pressure can be below atmospheric pressure as when the deoxygenation system also includes a pump that is connected to a gas discharge pipe.

The deoxygenation system can also include a chamber gas input pipe that terminates in a gas outlet in the chamber for injecting gas into the chamber. The gas outlet is positioned below the dispenser head to provide extra stripping action to further deoxygenate the liquid.

The deoxygenation system can further include a sifter plate that enhances contact of the liquid in the chamber and the gas injected into the chamber from the gas outlet. The sifter plate is positioned between the discharger head and the gas outlet and can consist of a plate extending across substantially the entire horizontal cross-section of the chamber. Numerous holes in the sifter plate create fine streams of water. More than one sifter plate can be utilized.

The liquid discharged from the tank has a reduced oxygen content as compared to the starting liquid. At least a portion of the discharged, deoxygenated liquid can be recirculated back into the tank via a recirculation pipe that terminates within the chamber in a recirculation dispenser head. Recirculation further strips away oxygen that may still be present. An optional recirculation gas input pipe can inject gas into the recirculation pipe prior to the recirculation dispenser head. When the deoxygenation system includes the sifter plate, the recirculation dispenser head is preferably positioned above the sifter plate.

The present invention is also directed to a process for deoxygenating a liquid containing oxygen. The process includes the steps of providing a deoxygenation tank having a deoxygenation chamber, providing a liquid flow to the chamber, injecting gas into the liquid flow and dispensing the gas and liquid into the chamber.

The present invention reduces the number of elements required in a deoxygenation unit and thereby overcomes the shortcomings of the aforementioned prior art.

Numerous other advantages and features of the present invention will become readily apparent from the following detailed description of the preferred embodiments, the Figures and the appended claims.

DETAILED DESCRIPTION OF THE PREFERRED EMBODIMENT

Figures 1, 2:
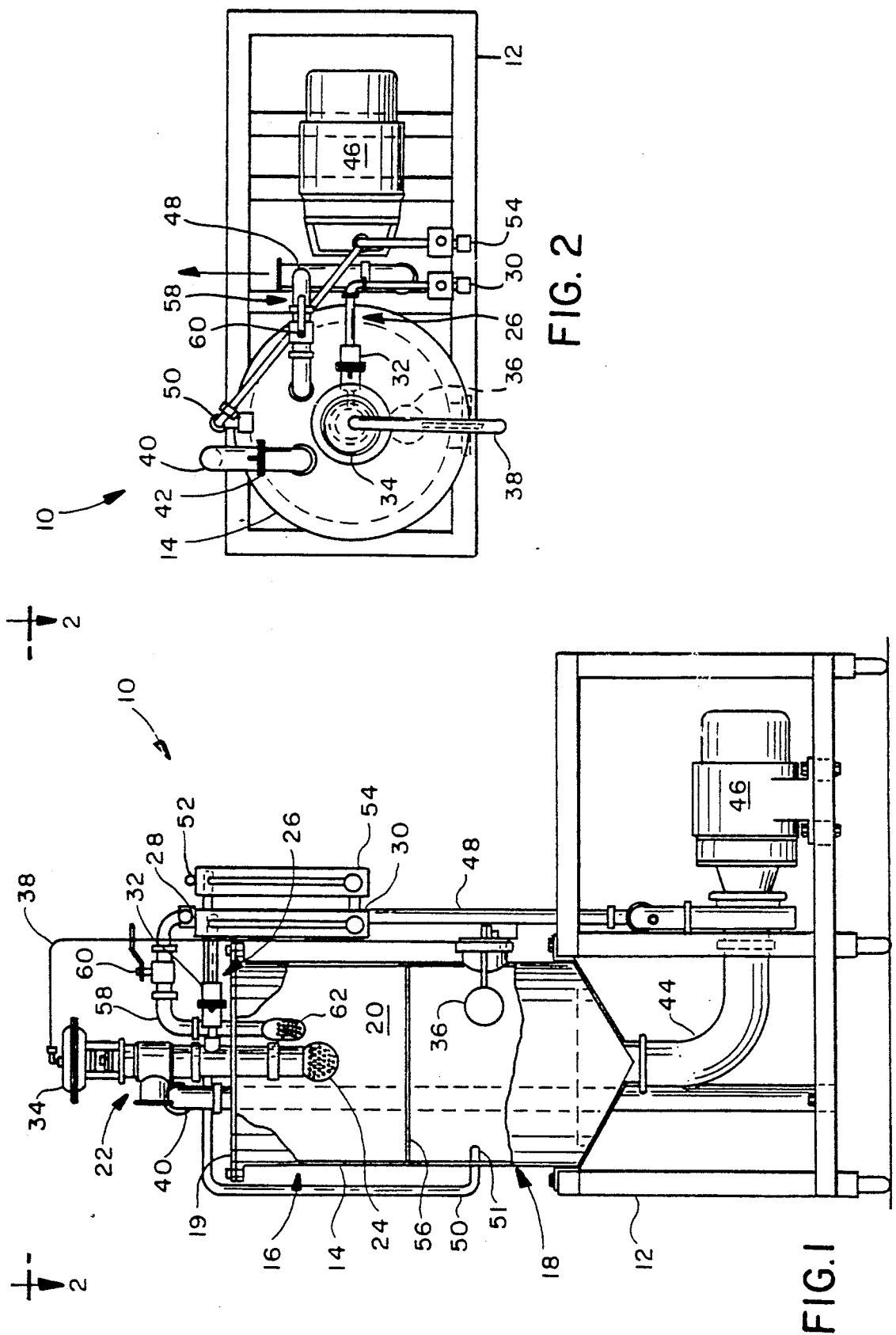
FIG. 1 is a side elevational view of the deoxygenation system with the deoxygenation tank partially broken away to reveal the chamber.
FIG. 2 is a top elevational view of the deoxygenation system taken along line 2—2 of FIG. 1.

Although this invention is susceptible to embodiment in many different forms, there are shown in the Figures and will be described in detail, a presently preferred embodiment of the invention. It should be understood, however, that the present disclosure is to be considered as an exemplification of the best mode incorporating the principles of this invention. On the other hand, the preferred embodiment is not intended to limit the invention in any manner whatsoever.

As illustrated in FIGS. 1 and 2, the deoxygenation system 10 has a base 12. A tank 14 defines a deoxygenation chamber 20 therein which has an upper section 16 and a lower section 18. The base 12 supports the tank 14. A liquid input pipe 22 extends through a top 19 of the tank 14 and terminates in a dispenser head 24 that is within the chamber 20. The dispenser head 24 is positioned in the upper section 16 of the chamber 20. A stripping gas inlet pipe 26 injects gas into the liquid input pipe 22 before or upstream of the dispenser head 24. Improved results can be achieved by increasing the distance between the gas inlet pipe 26 and the dispenser head 24 which increases the residence time for the stripping gas to displace dissolved oxygen in the liquid. The gas is supplied from a source (not shown) to an input 28 of a flowmeter 30 that controls the flow of gas to the gas inlet pipe 26. Preferably, the gas inlet pipe 26 has a check valve 32 that prevents liquid from flowing to the flowmeter 30.

The temperature of the liquid inputted into the chamber is preferably in a range of about 40° to about 90° F.

The liquid pressure in the liquid input pipe is preferably in the range of about 15 to about 75; more preferably about 20 to about 60, pounds per square inch gauge (psig).

The gas injected into the liquid input pipe is preferably at about the same pressure as the pressure within the liquid input pipe before injection of the gas. Preferably, at least a percentage of the injected gas forms a solution with the liquid.

Preferably, the volume ratio of liquid to gas is in the range of about 1:0.75 to about 1:1.25.

The pressure within the tank can be less than the pressure within the liquid input pipe. Preferably, the pressure within the tank is less than about 2 psig unless a pressure-reducing pump (not shown) is connected to the gas discharge pipe 40.

Fluid flow into the chamber 20 is controlled by a system including a liquid input control valve 34 operably connected to a float level control 36 by a line 38. The input control valve 34 and the float level control 36 can be pneumatic devices connected by pneumatic line 38.

Gases, including excess stripping gas and oxygen and other gases removed from the liquid, are discharged from the chamber 20 by gas discharge pipe 40 that preferably includes a check valve 42 which prevents gas from flowing back into the chamber 20.

Liquid having a reduced oxygen content as compared to the input liquid is discharged through liquid discharge pipe 44 at the bottom section 18 of the chamber 20 as by the action of a pump 46 that is supported by the base 12. A deoxygenated liquid input pipe 48 for a downstream apparatus (not shown) conveys the deoxygenated liquid from the pump 46.

In operation, the pump 46 is activated to draw deoxygenated liquid in through liquid discharge pipe 44 and out through deoxygenated liquid input pipe 48. In response to the removal of liquid from the tank 14, the float level control 36 changes from a "tank full" position to a "tank fill" position. This change in position causes liquid input control valve 34 to partially or completely open and permit liquid having oxygen therein to flow through the liquid input control valve 34 and the liquid input pipe 22. Gas from gas inlet pipe 26 is injected into the liquid input pipe 22. Optionally, gas flow through gas inlet pipe 26 can be controlled in response to the float level control 36.

The mixture of gas and liquid is dispensed into the deoxygenation chamber 20 through dispenser head 24. The dispenser head 24 preferably is configured to break the gas and liquid flow into a plurality of fine streams which increase the water surface area thus enhancing the stripping action of the gas.

It is presently believed that the stripping action is enhanced by utilizing fine streams having increased surface area because gas transport through the liquid is enhanced. Fine streams can be obtained by utilizing a dispenser head having numerous small holes therein.

As the liquid cascades down through the deaeration chamber 20, excess stripping gas, oxygen and other gases removed from the liquid are purged from the chamber 20 through gas discharge pipe 40.

When the liquid level within the tank 14 increases and causes the float level control 36 to return to the "tank full" position, the liquid input control valve 34 is shut thereby stopping liquid flow through liquid input pipe 22.

The liquid input control valve 34 can be partially or completely opened in response to the signal from the float level control 36 to control the rate of liquid flow. Thus, when the deoxygenated liquid is removed from the tank 14 at a relatively slow rate the float level control 36 is only partially displaced and the liquid input control valve 34 is partially open. When the deoxygenated liquid is removed at a higher rate, the float level control 36 is displaced to a greater extent and the liquid input control valve 34 is opened more to increase the rate of liquid flow. Thus, the present deoxygenation system 10 is self pacing in that, as the demand for deoxygenated liquid is increased, the amount of deoxygenated liquid produced also is increased.

Preferably, the deoxygenation system 10 includes chamber gas input pipe 50 that terminates within the lower section 18 of the chamber 20 in a gas outlet 51. Gas is supplied from a gas source (not shown) to an input 52 of a flowmeter 54 which controls the gas flow rate to the gas outlet 51. The flow of the gas from the gas outlet 51 is counter current to the flow of the liquid which further deoxygenates the liquid.

Also, the deoxygenation system 10 preferably includes a sifter plate 56 disposed between the dispenser head 24 and the gas outlet 51. The sifter plate 56 enhances the contact between the gas introduced into the chamber 20 from the gas outlet 51 and the liquid to further deoxygenate the liquid. The sifter plate 56 extends across substantially the entire horizontal cross-section of the tank 14. Contact is enhanced by forcing the liquid to flow through fine perforations in the sifter plate 56 which regenerates the fine streams of water. More than one sifter plate 56 can utilized. In this embodiment, the dispenser head 24 is preferably centered in a space defined by the top 19 of the tank 14, the sifter plate 56 and the sides of the tank 14.

Optionally, the deoxygenation system 10 can further include a recirculating pipe 58 for recirculating a portion of the deoxygenated liquid from the deoxygenated liquid input pipe 48 back into the tank 14. A valve 60 controls the recirculating flow. The recirculation pipe 58 terminates in a recirculation dispenser head 62 within the upper section 16 of the chamber 20. Optionally, stripping gas can be injected into the recirculation pipe (not illustrated).

The amount of deoxygenated liquid recirculated is preferably in the range of about 20 to about 40 volume percent. However, the optimum amount of deoxygenated liquid for recirculation is dependent upon the flow rate, water temperature and other parameters.

A preferred liquid is water to be utilized in beer or soft drink beverages

The stripping gas is conventional and is preferably carbon dioxide or nitrogen gas.

Typically, the water to be deoxygenated is at a temperature of about 40° F. and contains about 9.0 to about 12.9 parts per million (ppm) of dissolved oxygen. When the water flow rate is about 75 gallons per minute (gpm), the carbon dioxide flow rate into the liquid input pipe is about 600 cubic feet per hour (cph) and into the chamber is about 300 cph, about 25 volume percent of the deoxygenated water is recirculated and the pressure in the chamber is less than about 2 psig, about 80 to about 90 percent of the initial oxygen is removed.

This invention has been described in terms of specific embodiments set forth in detail, but it should be understood that these are by way of illustration only and that the invention is not necessarily limited thereto.

Modifications and variations will be apparent from this disclosure and may be resorted to without departing from the spirit of this invention, as those skilled in the art will readily understand. Accordingly, such variations and modifications of the disclosure are considered to be within the purview and scope of this invention and the following claims.

We claim:

1. A deoxygenation system for deoxygenating water containing oxygen comprising:
    a deoxygenation tank defining a deoxygenation chamber therein having upper and lower sections;
    a means for inputing water into the chamber, the input means having a means for dispensing water within the upper section of the chamber;
    a means for injecting gas capable of stripping oxygen from the water into the input means before the dispenser means;
    a chamber gas injector means for injecting gas into the lower section of the chamber;
    a means for enhancing contact between the water and the gas, the contact enhancing means being disposed between the dispenser means and the chamber gas injector means;
    a means for recirculating at least a portion of the deoxygenated water back into the chamber;
    means for discharging deoxygenated water that is not recirculated from the changer; and
    a means for discharging oxygen containing gas from the chamber.

2. The deoxygenation system in accordance with claim 1 further comprising means for providing a pressure within the deoxygenation chamber that is less than a pressure within the water input means, the providing means being the selection of the dimensions of the deoxygenation chamber and the dimensions of the water input means.

3. The deoxygenation system in accordance with claim 2 wherein the providing means results in the deoxygenation chamber pressure being less than about two pounds per square inch gauge and the liquid input means pressure being in the range of about 15 to about 75 pounds per square inch gauge.

4. The deoxygenation system in accordance with claim 1 wherein the dimensions of the deoxygenation chamber and of the fluid input means are selected to provide a pressure within the deoxygenation chamber that is less than a pressure within the fluid input means.

5. A deoxygenation system for deoxygenating a liquid containing oxygen comprising:
    a deoxygenation tank defining a deoxygenation chamber therein having an upper section and a lower section;
    a means for inputting liquid into the chamber, the input means having a means for dispensing liquid within the chamber;
    a means for injecting stripping gas capable of removing oxygen from the liquid into the input means before the dispenser means;
    means for discharging deoxygenated liquid from the chamber;
    a means for discharging stripped oxygen containing gas from the chamber, the stripped gas discharge means being located in the upper section of the chamber; and
    a chamber gas injector means for injecting additional stripping gas into the chamber at a position spaced below the dispensing means to achieve counter current flow of the additional stripping gas with the liquid dispensed into the chamber.

6. The deoxygenation system in accordance with claim 5 further comprising a means for enhancing contact between the liquid and the stripping gas, the contact enhancing means being disposed between the dispenser means and the chamber gas injector means.

7. The deoxygenation system in accordance with claim 6 wherein the liquid inputting means is a water inputting means, the liquid dispensing means is a water dispensing means, the deoxygenated liquid discharging means is a deoxygenated water discharging means, the chamber gas injector means injects stripping gas to achieve counter current flow with the water dispensed into the chamber, and the contact enhancing means for enhancing contact between the liquid and the stripping gas is a means for enhancing contact between the water and the stripping gas.

8. The deoxygenation system in accordance with claim 6 wherein the contact enhancing means comprises at least one plate having perforations.

9. The deoxygenation system in accordance with claim 6 wherein the contact enhancing means comprises at least one plate having perforations and which generate streams.

10. A deoxygenation system for deoxygenating a liquid containing oxygen comprising:
    a deoxygenation tank defining a deoxygenation chamber therein having an upper section and a lower section;
    a means for inputting liquid into the chamber, the input means having a means for dispensing liquid within the chamber;
    a means for injecting stripping gas capable of stripping oxygen from the liquid into the input means before the dispenser means;
    a means for discharging deoxygenated liquid from the chamber;
    a means for discharging stripped oxygen containing gas from the chamber, the stripped gas discharge means being located in the upper section of the chamber; and
    a means for recirculating at least a portion of the deoxygenated liquid back into the chamber, the recirculation means including a means for dispensing the recirculation liquid within the chamber.

11. The deoxygenation system in accordance with claim 10 wherein the recirculation means further comprises a means for injecting stripping gas into the recirculation means before the recirculation dispenser means.

12. A process for deoxygenating a liquid containing oxygen comprising the steps of:
    providing a tank defining a deoxygenating chamber;
    providing a liquid flow to the chamber;

injecting stripping gas capable of stripping oxygen from the liquid into the liquid flow;

dispensing the stripping gas and liquid into the chamber;

discharging deoxygenated liquid from the chamber;

discharging stripped oxygen containing gas from the chamber; and injecting additional stripping gas into the chamber at a position to achieve counter current flow of the additional stripping gas with the liquid dispensed into the chamber.

13. The process in accordance with claim 12 further comprising the step of sifting the liquid to produce streams of liquid at a position in the chamber between where the stripping gas and liquid are dispensed and where additional stripping gas is injected into the chamber.

14. The process in accordance with claim 13 further comprising the step of reducing the pressure of liquid with injected gas upon dispensing into the chamber.

15. A process for deoxygenating a liquid containing oxygen comprising the steps of:

providing a tank defining a deoxygenating chamber;

providing a liquid flow to the chamber;

injecting stripping gas capable of stripping oxygen from the liquid into the liquid flow;

dispensing the stripping gas and liquid into the chamber;

discharging stripped oxygen containing gas from the chamber;

discharging at least partially deoxygenated liquid from the chamber; and recirculating at least a portion of the discharged liquid back into the chamber.

16. The process in accordance with claim 15 further comprising the step of injecting stripping gas into the recirculation liquid during recirculation.

17. The process in accordance with claim 15 wherein the step of providing a liquid flow is a step of providing a water flow, the step of injecting stripping gas into the liquid flow is a step of injecting stripping gas into the water flow, the step of dispensing liquid is a step of dispensing water, the step of discharging at least partially deoxygenated liquid is a step of discharging at least partially deoxygenated water and the step of recirculating at least a portion of the discharged liquid is a step of recirculating at least a portion of the discharged water.

18. A process for deoxygenating a liquid containing oxygen comprising the steps of:

providing a tank defining a deoxygenating chamber;

providing a liquid flow to the chamber;

injecting stripping gas capable of stripping oxygen from the liquid into the liquid flow;

dispensing the stripping gas and liquid into the chamber;

discharging deoxygenated liquid from the chamber;

discharging stripped oxygen containing gas from the chamber; and reducing the pressure of the liquid with the injected gas upon dispensing into the chamber.

* * * * *